(12) United States Patent
Rastogi et al.

(10) Patent No.: US 11,870,358 B2
(45) Date of Patent: Jan. 9, 2024

(54) FAULT DETECTION IN A THREE-PHASE DAB CONVERTER

(71) Applicant: DEERE & COMPANY, Moline, IL (US)

(72) Inventors: Sagar K Rastogi, Raleigh, NC (US); Brij N. Singh, West Fargo, ND (US)

(73) Assignee: Deere & Company, Moline, IL (US)

( * ) Notice: Subject to any disclaimer, the term of this patent is extended or adjusted under 35 U.S.C. 154(b) by 149 days.

(21) Appl. No.: 17/396,739

(22) Filed: Aug. 8, 2021

(65) Prior Publication Data

US 2022/0115958 A1 Apr. 14, 2022

Related U.S. Application Data (60) Provisional application No. 63/220,844, filed on Jul. 12, 2021, provisional application No. 63/143,768, filed on Jan. 29, 2021, provisional application No. 63/198,284, filed on Oct. 8, 2020.

(51) Int. Cl.
*H02M 3/335* (2006.01)
*H02M 1/32* (2007.01)

(52) U.S. Cl.
CPC ....... *H02M 3/33584* (2013.01); *H02M 1/325* (2021.05)

(58) Field of Classification Search
CPC .............................................. H02M 3/335–42
See application file for complete search history.

(56) References Cited

FOREIGN PATENT DOCUMENTS

EP 2003758 A1 * 12/2008 ............... H02J 3/26

OTHER PUBLICATIONS

Davoodi, A. et al. "A novel transistor open-circuit fault localization scheme for three-phase dual active bridge." In 2018 Australasian Universities Power Engineering Conference (AUPEC), pp. 1-6. IEEE, 2018.
Shimura, K. et al. "Examination of High-$ Q $-Factor Conductor-Embedded Planar Transformer With Magnetic Flux-Path Control Technology." IEEE Transactions on Magnetics 56, No. 3 (2020): 1-4.
Chao, K-H et al. "Fault Diagnosis and Tolerant Control of Three-Level Neutral-Point Clamped Inverters in Motor Drives." Energies 13, No. 23 (2020): 6302.
European Patent Office Search Report for Appl. No. 21190376.0 dated Feb. 4, 2022.
Lu, B. et al. "A literature review of IGBT fault diagnostic and protection methods for power inverters." IEEE Transactions on industry applications 45, No. 5 (2009): 1770-1777.
Yang, Y. et al. "Fault Detection Method of Modular Multilevel Converter Based on Current Mean Value and SVM." In 2020 Chinese Control and Decision Conference (CCDC), pp. 4058-4063. IEEE, 2020.

(Continued)

*Primary Examiner* — Peter M Novak
(74) *Attorney, Agent, or Firm* — Michael G. Monyok (57) ABSTRACT

A system and method of fault detection based on a detailed waveform analysis is presented for transient and steady-state fault operation of 3-Φ DAB converter. Main symptoms of the converter during normal and fault conditions have been identified and a unique pattern in DC bias of phase currents under fault mode is noted. The logic-based fault diagnosis scheme is used to detect the fault and identify the faulty transistor.

13 Claims, 13 Drawing Sheets

(56) References Cited

OTHER PUBLICATIONS

Xie, D. et al. "Open-circuit fault diagnosis of dual active bridge DC-DC converter based on residual analysis." In 2018 IEEE International Power Electronics and Application Conference and Exposition (PEAC), pp. 1-6. IEEE, 2018.

Airabella, A. M. et al. "Open transistors and diodes fault diagnosis strategy for dual active bridge DC-DC converter." In 2012 10th IEEE/IAS International Conference on Industry Applications, pp. 1-6. IEEE, 2012.

Shi, H. et al. "Fault analysis and fault-tolerant method of dual active bridge converter under triple phase shift control." In 2019 10th International Conference on Power Electronics and ECCE Asia (ICPE 2019-ECCE Asia), pp. 1121-1127. IEEE, 2019.

* cited by examiner

FIG. 6A  Logic-based DC bias detection scheme for phase currents (Step 1).

FIG. 6B
$$P = A \cdot B \cdot C$$
$$S = \bar{P} \cdot (A + B + C)$$
Faulty bridge identification (Step 2).

FIG. 6C  Primary side faulty transistor Identification (Step 3).

FIG. 6D  Secondary side faulty transistor identification (Step 3).

FAULT DETECTION IN A THREE-PHASE DAB CONVERTER

CROSS-REFERENCE TO RELATED APPLICATIONS

This application claims the benefit under 35 U.S.C. § 119 of Provisional Application Ser. No. 63/198,284, filed Oct. 8, 2020; Provisional Application Ser. No. 63/143,768, filed Jan. 29, 2021; and Provisional Application Ser. No. 63/220,884, filed Jul. 12, 2021, each of which is incorporated herein by reference.

STATEMENT REGARDING FEDERALLY SPONSORED RESEARCH

This invention was made with U.S. government support under contract or award No. DE-EE0006521 awarded by the Department of Energy. The Government has certain rights in the invention. The award subrecipient, John Deere Electronic Solutions, Inc., of the aforementioned contract or award elects title to any and all subject inventions set forth in this disclosure for U.S. and any European patent filings.

BACKGROUND OF THE INVENTION

The present disclosure relates generally to power converters. More specifically, the disclosure relates to a method and system for detecting open-circuit faults in three-phase Dual Active Bridge (DAB) converters. With wide-scale adoption of power electronic converters, their reliability has become increasingly important. One popular DC-DC converter topology is the DAB, as it provides bidirectional power transfer and galvanic isolation between the input/output terminals. The three-phase DAB (3-Φ DAB) topology has shown great promise for higher power applications.

Constant increase in energy demand requires systems to be more efficient and reliable. The DAB DC-DC converter is known to provide benefits in terms of efficiency, power density, and bidirectional power transfer, as it operates with inherent soft switching (zero voltage switching) and high-frequency link. The three-phase variant of the DAB converter has potential for the higher power applications like DC grid connections and heavy-duty vehicles. For given semiconductor ratings, the 3-Φ DAB results in reduced filtering requirements, reduced AC-link current harmonics and higher power transfer capability when compared to the single-phase DAB converter (1-Φ DAB).

With a DAB converter, an open-circuit fault may occur due to semiconductor device failure or gate drive circuit failure. A survey on reliability of power electronics reported that 15% of component failures are related to gate drive and 31% are related to the semiconductor device. Both these failures can stop the switching of the device and lead to an open-circuit fault. Further, with the adoption of wide-bandgap semiconductor devices, the rate of failure changes with 19% of component failures related to the gate drive and 57% related to the semiconductor device. In some prior work, the open-circuit fault mode operation, detection, and fault-tolerant strategies were discussed for 1-Φ DAB. The post detection fault tolerant strategies were reported for 3-Φ DAB in other works. However, these studies assume that the fault location is known and do not provide strategies to detect and identify the location of the fault.

Therefore, it would be advantageous to develop a system and method for detecting a fault condition to prevent damage to the converter.

BRIEF SUMMARY

In this disclosure, a detailed waveform analysis is presented for transient and steady-state fault operation of 3-Φ DAB. Main symptoms of the converter during normal and fault conditions have been identified and a unique pattern in DC bias of phase currents under fault mode is noted. A logic-based fault diagnosis method is disclosed to detect the fault and identify the faulty transistor.

DETAILED DESCRIPTION

Three-Phase DAB: Normal Operation Vs Fault Mode Operation

Figure 1:
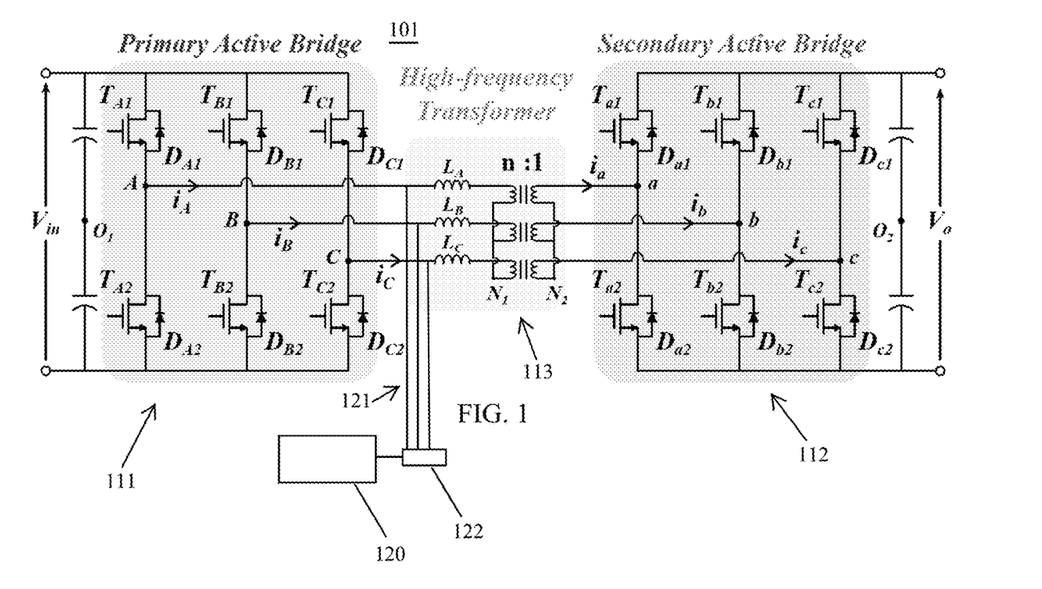
FIG. 1 is a schematic of a three-phase dual active bridge converter.

The topology of three-phase dual active bridge (3-Φ DAB) converter 101 is shown in FIG. 1. It consists of two three-phase active bridges 111/112 connected through a transformer-inductor arrangement 113. The input bridge (referred to as primary bridge 111) acts as an inverter and converts the DC input into high-frequency AC. These AC voltages and currents are transformed as per the turns ratio of the high-frequency transformer. The output bridge (referred to as the secondary bridge 112) acts as a rectifier and converts the transformed AC to DC output.

Normal Operation

Figure 2:
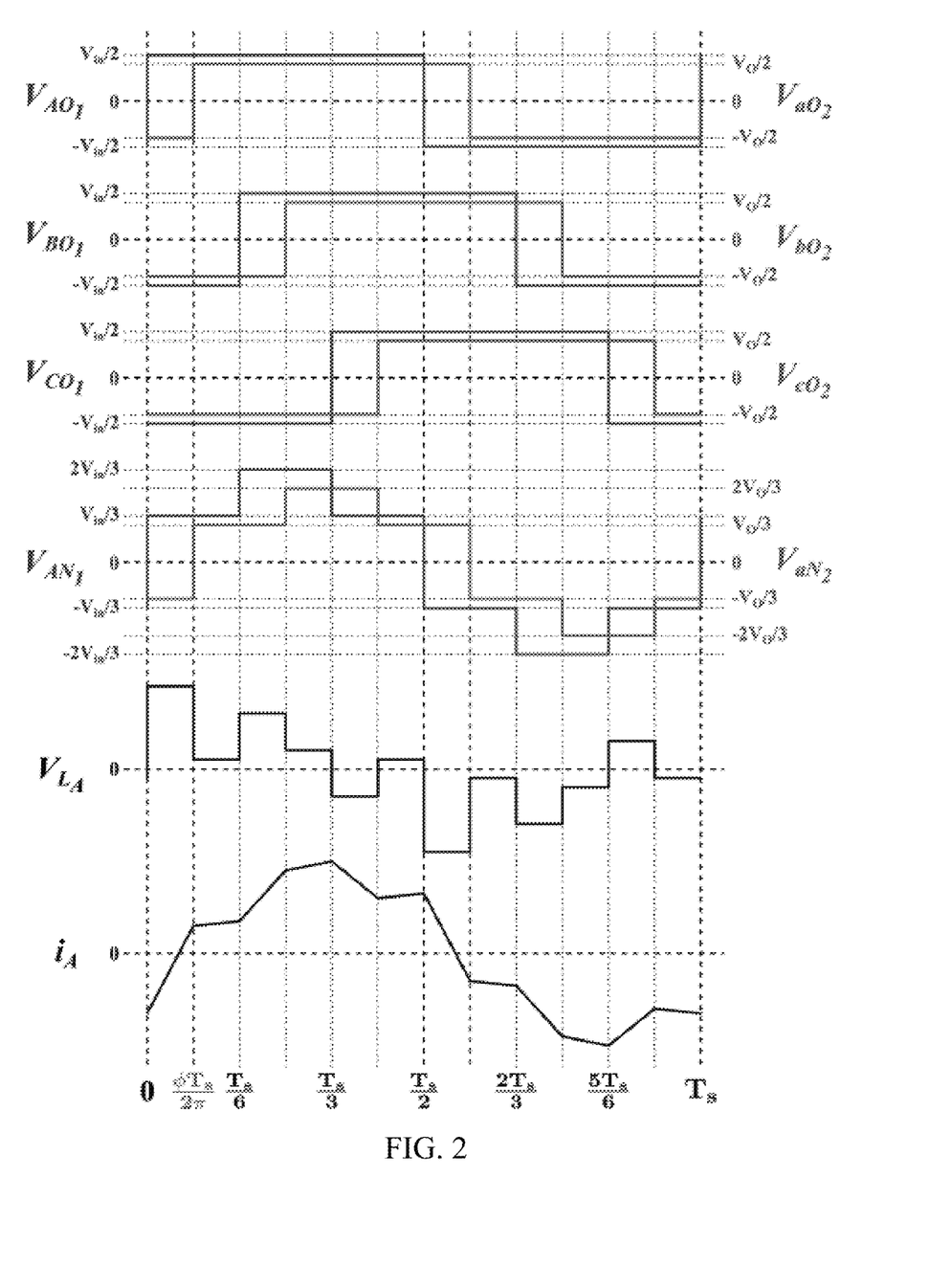
FIG. 2 depicts the normal steady-state current waveforms of a three-phase dual active bridge.

The 3-Φ DAB 101 is typically operated with 50% duty cycle for each phase-leg 'χ' i.e. Tχ1 and Tχ2 are ON for 50% time period (Ts) and are complementary to each other. The gate signals for different phase-legs in a bridge are shifted by 120° with respect to each other. FIG. 2 shows the normal operating AC current waveforms of 3-Φ DAB converter 101.

The power transfer of the 3-Φ DAB 101 is dependent on the phase-shift angle (ø) between the input and output bridge. The converter can have two modes of operation $0 \le ø \le \pi/3$ and $\pi/3 < ø \le \pi/2$. The power transfer equations for 3-Φ DAB 101 are given by (1), where $D=nV_o/V_{in}$. For reverse power transfer, the phase shift (ø) is negative.

$$P = \frac{V_{in}^2 D}{2\pi f_s L} \phi \left( \frac{2}{3} - \frac{\phi}{2\pi} \right), \quad 0 \le \phi \le \frac{\pi}{3} \tag{1}$$

$$P = \frac{V_{in}^2 D}{2\pi f_s L} \left( \phi - \frac{\phi^2}{\pi} - \frac{\pi}{18} \right), \quad \frac{\pi}{3} < \phi \le \frac{\pi}{2}$$

Figure 3:
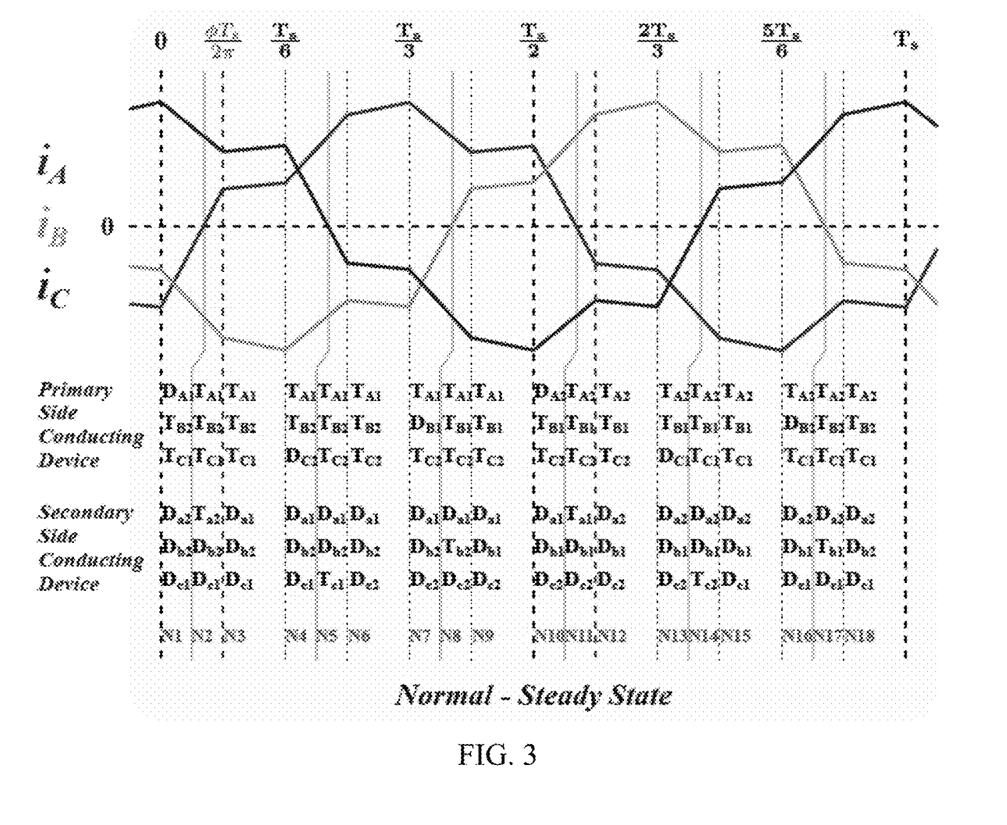
FIG. 3 is a graph showing normal mode steady-state phase current waveforms for a three-phase dual active bridge converter.

Under normal operation, there is no DC bias in the phase currents, and they are 120 shifted with respect to each other. Assuming no dead-time between the top and the bottom switches, the switching time period ($T_s$) under normal operation can be divided into 18 states based on the conducting devices. For $0 \le \phi \le \pi/3$, the AC phase current waveforms are shown in FIG. 3. The conducting devices in each state (N1 to N18) are listed below the waveforms in the figure. The relationship between the currents and voltages across the phase inductors is given by (2).

$$i_A + i_B + i_C = 0 \tag{2}$$

$$\begin{bmatrix} V_{L_A} \\ V_{L_B} \\ V_{L_C} \end{bmatrix} = \begin{bmatrix} L_A \frac{di_A}{dt} \\ L_B \frac{di_B}{dt} \\ L_C \frac{di_C}{dt} \end{bmatrix} = \begin{bmatrix} \frac{2}{3} & -\frac{1}{3} & -\frac{1}{3} \\ -\frac{1}{3} & \frac{2}{3} & -\frac{1}{3} \\ -\frac{1}{3} & -\frac{1}{3} & \frac{2}{3} \end{bmatrix} \cdot \begin{bmatrix} V_{AO_1} - nV_{aO_2} \\ V_{BO_1} - nV_{bO_2} \\ V_{BO_1} - nV_{bO_2} \end{bmatrix}$$

Fault Mode Operation

Any component failure in the gate drive circuit of the transistor, or the failing of the transistor itself can lead to an open-circuit fault. Following assumptions are made to simplify the analysis.

1. Only one transistor fails open (stops switching).
2. The diode corresponding to the faulty transistor is functional; in case of (a) semiconductor or gate-drive failure in the insulated-gate bipolar transistor (IGBT)-based system with anti-parallel diode, and (b) gate-drive failure in the system comprising of MOSFET, SiC-FET or GaN-HeMT without the anti-parallel diodes.
3. The waveforms are shown for $0 \le \phi \le \pi/3$ for positive power flow. However, the diagnosis scheme is valid for full range ($0 \le \phi \le \pi/2$), and the results are symmetric for the reverse power flow.
4. The reverse conduction in the device is considered to be through the diode and represented as a separate state. This allows the study to be valid for all types of semiconductor devices (IGBT, MOSFET, SiC-FET or GaN-HeMT).

FIG. 3 shows which transistors conduct in each state. Under normal operation of 3-Φ DAB converter 101, each transistor on the primary side 111 conducts for 8 out of 18 conduction states; on the secondary side 112, each transistor conducts for only 1 out of 18 conduction states. This indicates that the effect of primary side 111 open-circuit fault will be much more pronounced than the fault on the secondary side 112. In contrast, a single-phase DAB primary side transistor conducts 2 out of 6 conduction states and the secondary side transistor conducts for 1 out of 6 conduction states.

Figure 4A:
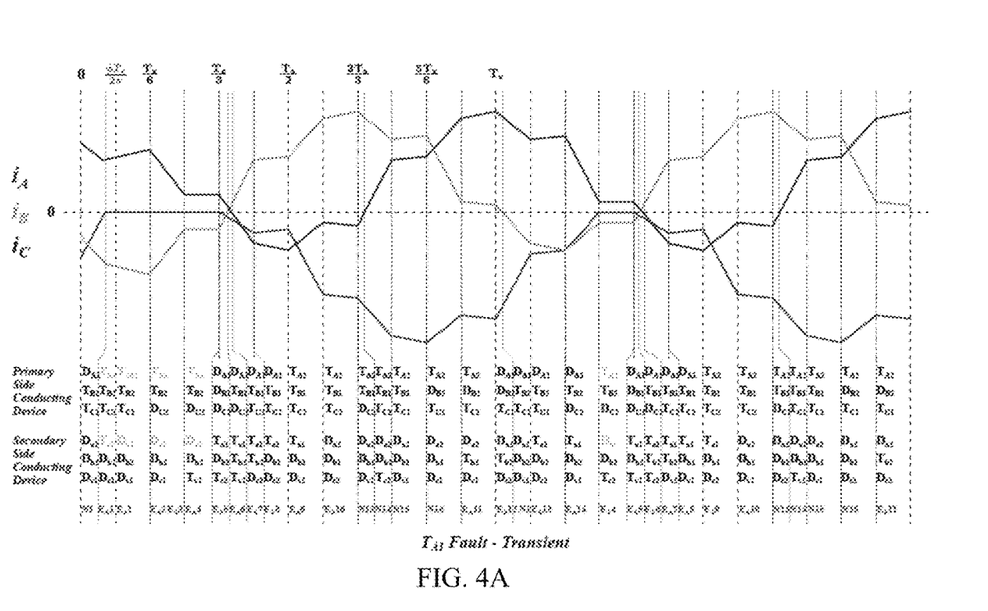
FIGS. 4A-4B are primary side open-circuit fault mode operating waveforms of a three-phase dual active bridge.
Figure 4B:
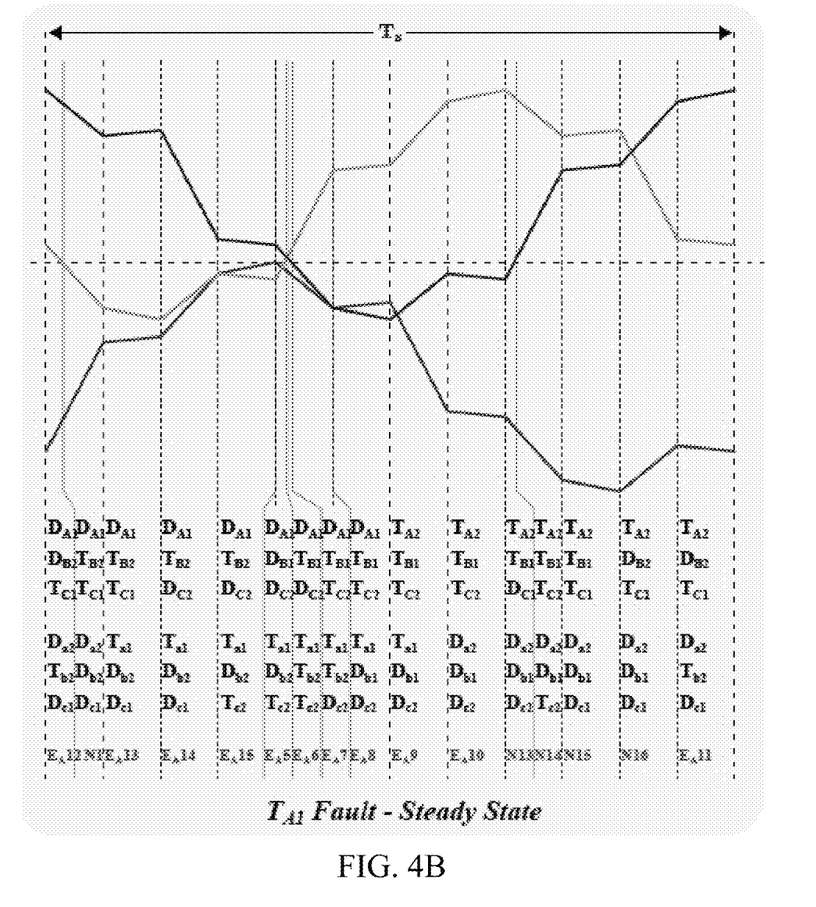

Primary Fault ($T_{A1}$): FIG. 4A and FIG. 4B show how the phase currents change when the primary side $T_{A1}$ is faulted. Both transient and steady-state waveforms under fault mode are shown. For $T_{A1}$ fault, the positive volt-seconds across $L_A$ reduces and the current $i_A$ develops a negative DC bias.

The current $i_B$ and $i_C$ develop positive DC bias according to the equations (2). For a $T_{A1}$ fault, the negative volt-seconds across $L_A$ reduces and the current $i_A$ develops a positive DC bias. The current $i_B$ and $i_C$ develop negative DC bias according to the equations (2). Since the phase A has no path for positive current, $i_A$ completely shifts below the zero line, resulting in a large DC bias.

TABLE I

DC BIAS PATTERN FOR OPEN-CIRUIT FAULT

| Primary Side | | | |
| --- | --- | --- | --- |
| Faulty Transistor | $i_A$ | $i_B$ | $i_C$ |
| $T_{A1}$ | − | + | + |
| $T_{A2}$ | + | − | − |
| $T_{B1}$ | + | − | + |
| $T_{B2}$ | − | + | − |
| $T_{C1}$ | + | + | − |
| $T_{C2}$ | − | − | + |
| Secondary Side | | | |
| $T_{a1}$ | + | − | 0 |
| $T_{a2}$ | − | + | 0 |
| $T_{b1}$ | 0 | + | − |
| $T_{b2}$ | 0 | − | + |
| $T_{c1}$ | − | 0 | + |
| $T_{c2}$ | + | 0 | − |

Figure 5A:
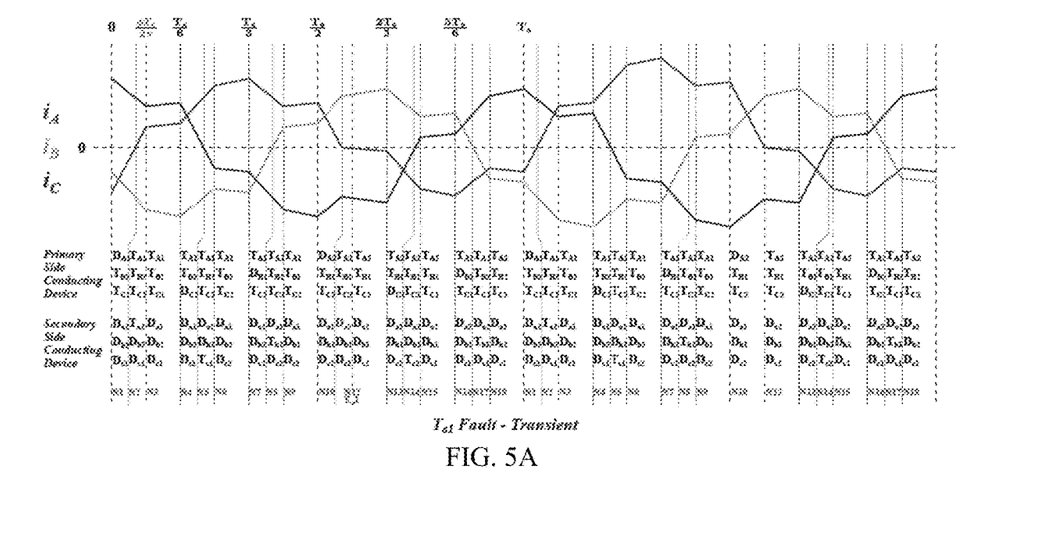
FIGS. 5A-5B are secondary side open-circuit fault mode operating waveforms of a three-phase dual active bridge.
Figure 5B:
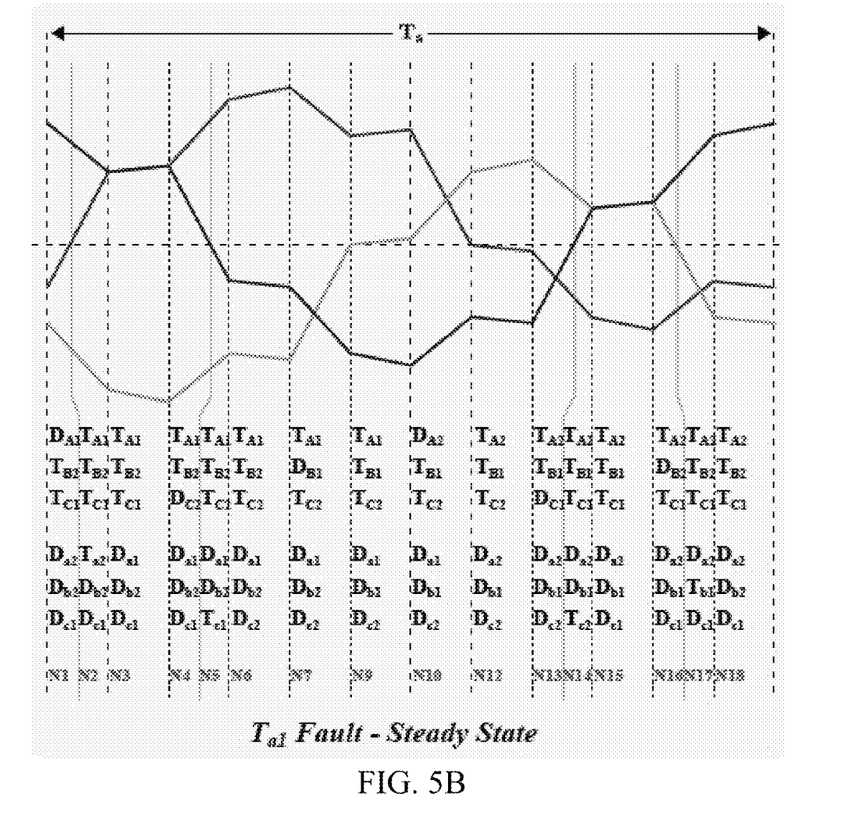

Secondary Fault ($T_{a1}$): FIGS. 5A and 5B show how the phase currents change when the secondary side $T_{a1}$ is faulted. No new states of conduction are observed, however, in steady-state, states N8 and N11 get skipped. For $T_{a1}$ fault, the negative volt-seconds across $L_A$ reduces and the current $i_A$ develops a positive DC bias. The currents $i_B$ and $i_C$ develop a negative DC bias according to equations (2). However, phase C DC bias decays to zero in post fault steady-state (as shown in FIGS. 5A-5B).

In similar manner, the DC bias pattern can be obtained for all the transistor failures and are shown in Table I. The DC bias pattern among the top and bottom transistors of each leg is reversed, and the pattern is cyclic among the three phases. Each fault mode has a unique signature which has been exploited to develop a fault identification scheme.

Fault Diagnosis Scheme

All the fault conditions listed in Table I produce a DC bias in the phase currents. This DC bias can cause the magnetic elements (inductors and transformers 113) to saturate. It can also cause device failure and extra losses. Therefore, it is of interest to detect the fault as soon as possible and take corrective action. The devices usually handle high currents for a small amount of time. If the response is fast enough to prevent the transformer 113 from saturating (order of milliseconds), corrective action can be taken before catastrophic failure.

Figure 6A:
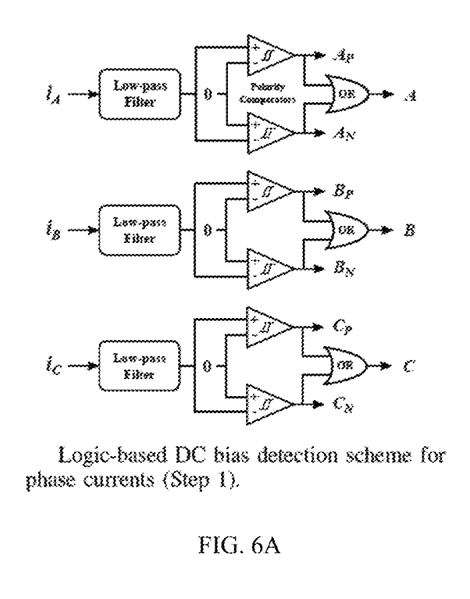
FIG. 6A-6D depict steps of a method of fault identification, according to one embodiment.

The fault diagnosis consists of three steps. First, detecting that a fault has occurred. Second, identifying the side of the fault. Third, identifying exactly which transistor has failed. FIG. 6A shows the graphic representation of step 1. By passing the sensed currents ($i_A$, $i_B$, $i_C$) through low-pass filter 122 or calculating the moving average of the sensed currents over a switching period, the DC bias value can be identified. Then, by comparing the value with zero the DC bias is positive of negative can be flagged. Flag X indicates whether the current $i_X$ has a DC bias or not. If there is no DC bias in the current $i_X$, then flag X will be set. If the DC bias is positive, then $X_P$ is set. Else, if the DC bias is negative, then $X_N$ is set.

Figure 6B:
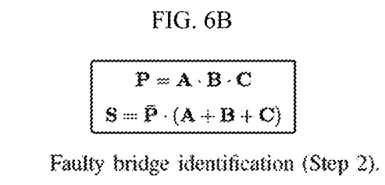

Step 2 is shown in FIG. 6B. If all the phase currents show DC Bias, then the fault is on the primary side (P is flagged). If the fault is not on primary side and the DC bias in some currents is present, then the fault is on the secondary side (S is flagged).

Figure 6C:
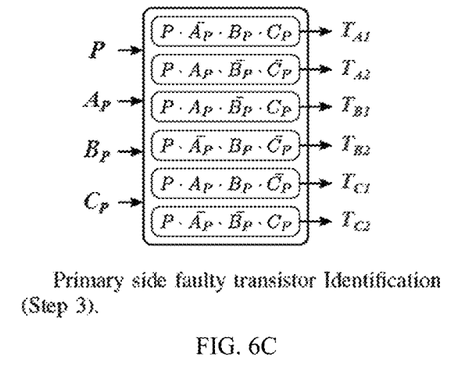
Figure 6D:
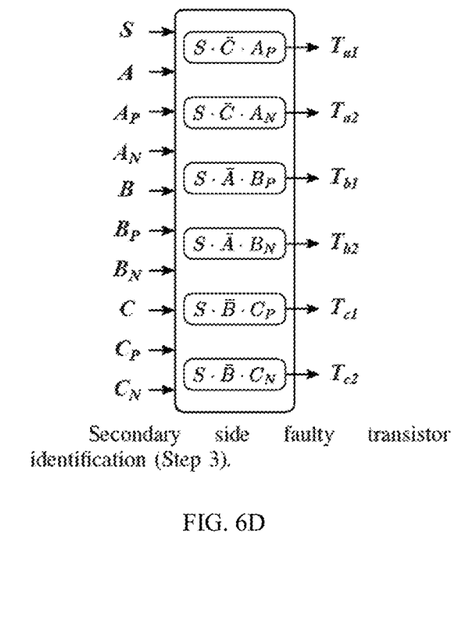

FIG. 6C and FIG. 6D show the faulty transistor detection scheme for the primary and secondary side, respectively (Step 3). The scheme is presented as logic equations and is based on the DC bias pattern given in Table I.

Results

The identification scheme for 3-Φ DAB open-circuit fault was tested according to the rated specification listed in Table II. 1200 V Silicon Carbide three-phase modules were used for both primary and secondary side active bridges 111/112. Three single-phase hand-wound transformers 113 were connected in star-star configuration and external inductors were used to realize the phase inductances.

TABLE II

OPERATING PARAMETERS

| Parameter | Symbol | Value |
| --- | --- | --- |
| Power | P | 5.5 kW |
| Input Voltage | $V_{in}$ | 800 V |
| Output Voltage | $V_o$ | 800 V |
| Turns Ratio | n | 1 |
| Switching frequency | $f_s$ | 100 kHz |
| Phase Inductance | L | 78 μH |

Figure 7:
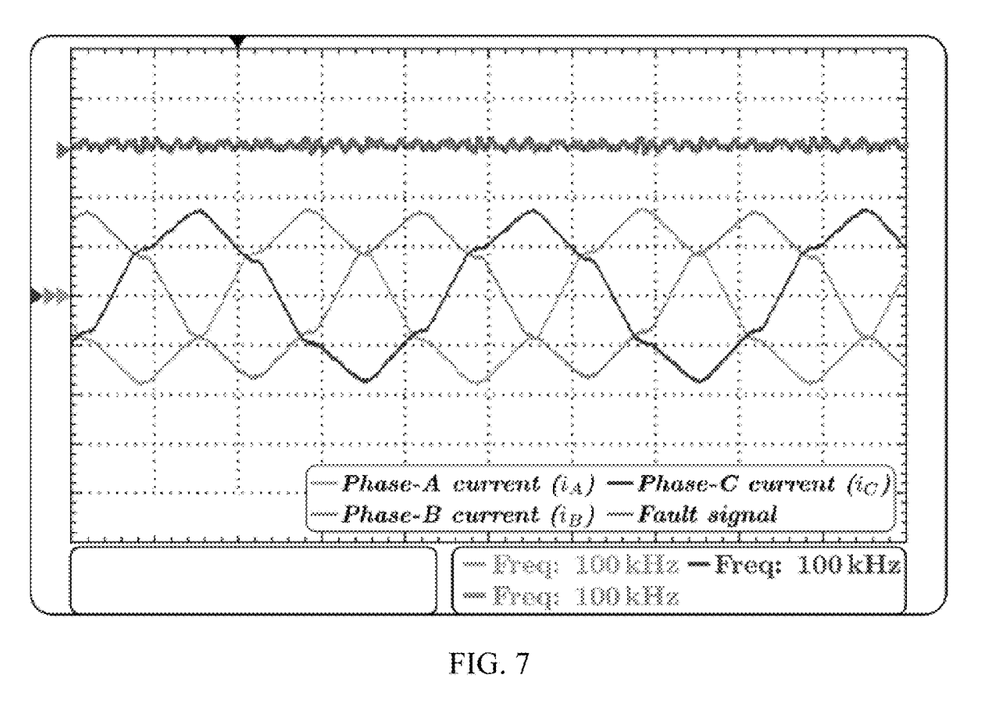
FIG. 7 are normal mode steady-state current waveforms of a three-phase dual active bridge.

FIG. 7 shows the normal operating waveforms of the phase currents at rated power of 5.5 kW at 100 kHz switching frequency. The phase currents are balanced and 120° phase shifted with respect to each other. The DC bias is in the currents is zero and phase shift of 48° between the primary bridge 111 and secondary bridge 112 of the converter 101 is observed (states N1+N2).

For experiments, a fault is introduced by blocking the gate pulse of the target transistor and the corresponding results are provided in this section.

One-Side Current Sensing

Figure 8A:
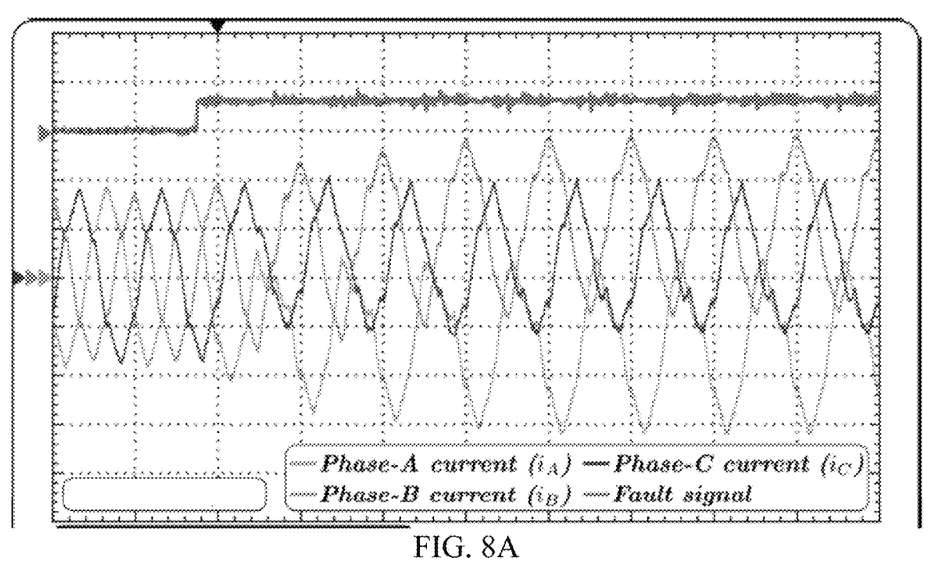
FIGS. 8A-8B show the DC bias under fault mode for the primary side phase currents (FIG. 8A) and secondary side phase currents (FIG. 8B).
Figure 8B:
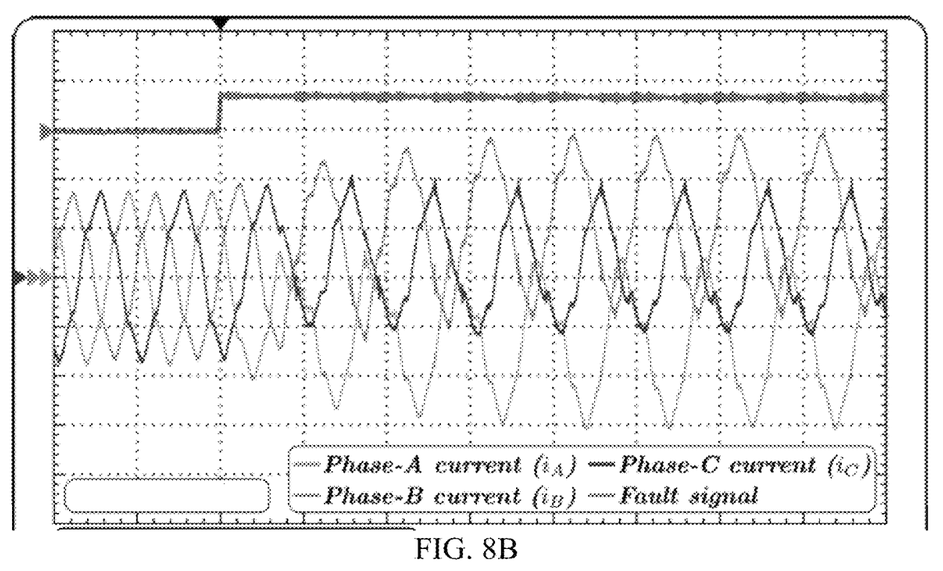

FIGS. 8A-8B shows the phase currents when a primary side fault is introduced at the phase-A top switch ($T_{A1}$). FIG. 8A and FIG. 8B show the observed currents on the primary side as well as the secondary side of the transformer 113, respectively. It is seen that the DC bias get reflected and is present on both sides of the transformers 113. This indicates that sensing of currents on one-side of the transformer 113 is sufficient for detecting and identification of the faults on both sides of the transformer 113.

The ability to sense current on one side provides a cost and design benefit especially in high-power and high-gain converters. The high-current and high-frequency current sensors are very costly compared to the low-current and high-frequency sensors. The results in FIG. 8A-8B show that in the high-power/high-gain converters, the current sensors can be placed on the high-voltage/low-current side only and the detection scheme can identify the faults on both sides of the transformer. Moreover, since the identification scheme is based on the DC bias of the phases current and not the exact waveshape of the currents, the cost of the sensors can be further reduced by using the low current and low bandwidth sensors. At a minimum, detection can be accomplished with 3 current sensors and no additional circuit modification.

Note that the DC bias will eventually shift to the magnetizing current and risk transformer saturation if corrective measures are not taken. However, the results indicate that the magnetizing current ($i_A-n_{ia}$) rises much slower (order of milliseconds). Therefore, the detection scheme is capable of detecting the faults much before the risk of saturation.

Primary Side Fault Mode Operation

Figure 9A:
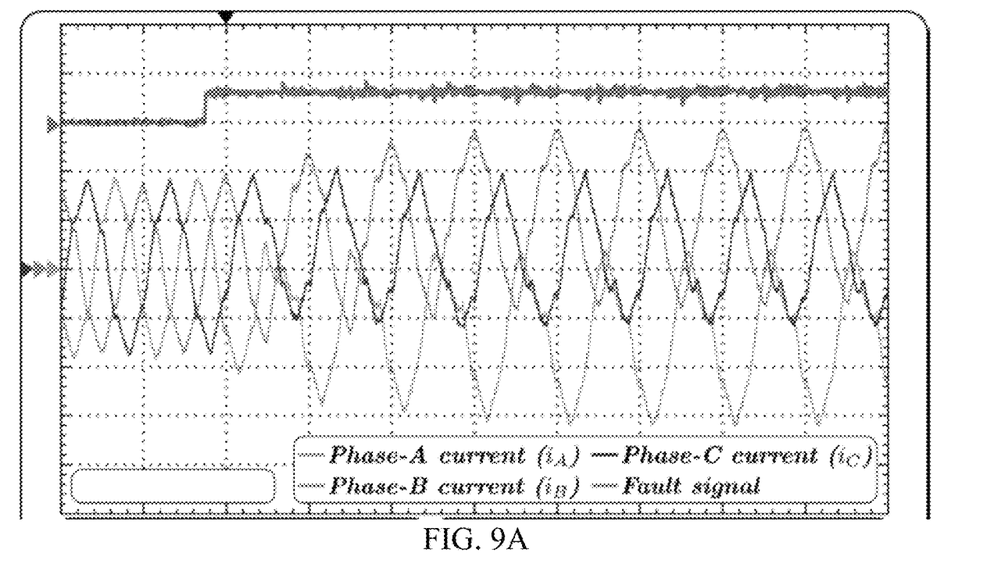
FIGS. 9A-9B show primary fault mode waveforms, with phase currents (FIG. 9A) and DC bias of the phase currents (FIG. 9B) depicted.
Figure 9B:
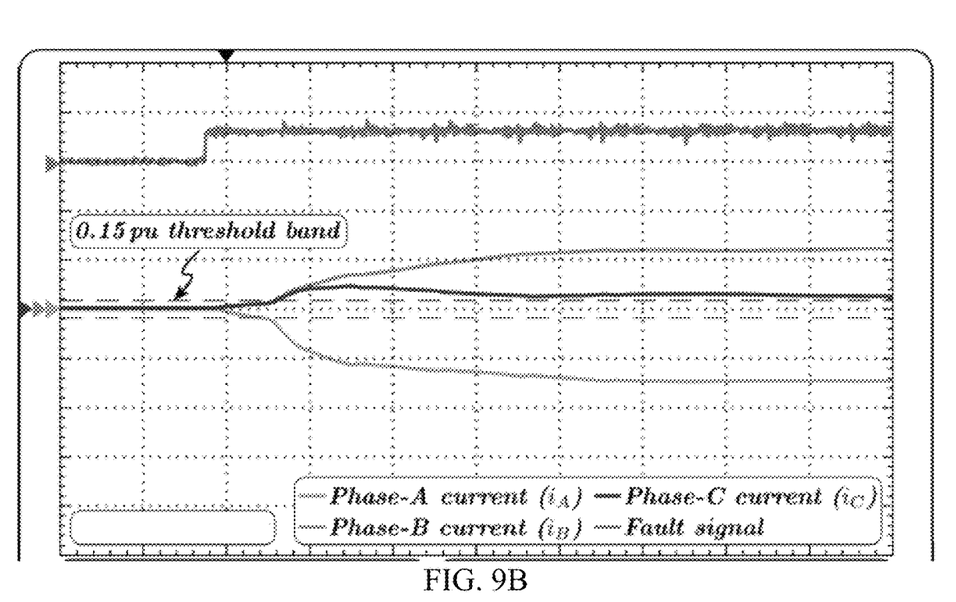

FIGS. 9A-9B show the phase current waveforms when a primary side fault is introduced at the phase-A top switch ($T_{A1}$). FIG. 9A shows the waveform signature and FIG. 9B shows the time averaged waveforms over $T_s$. The averaged waveforms show the DC bias built in the phase currents in the fault mode. The current $i_A$ shows a negative DC bias, and the currents $i_B$, $i_C$ show a positive DC bias. This pattern matches the predicted patter in Table I.

FIG. 9B also indicates that a threshold of 15% (0.15 pu) with respect to the input DC current can be used for fault indication using the logic-based scheme. The threshold or the hysteresis band is required to avoid false triggers due to noise in the sensed signals.

Secondary Side Faut Mode Operation

Figure 10A:
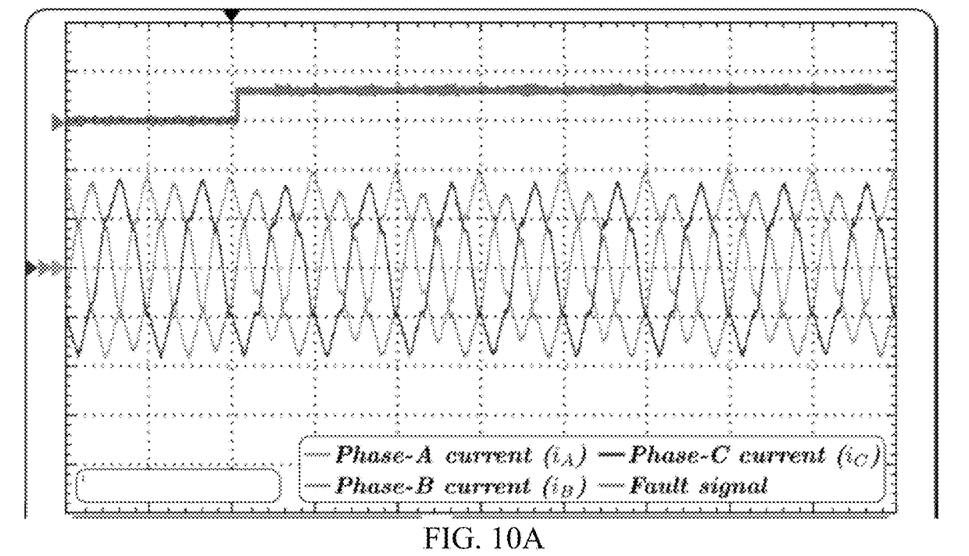
FIGS. 10A-10B show secondary fault mode waveforms, with phase currents (FIG. 9A) and DC bias of the phase currents (FIG. 9B) depicted.
Figure 10B:
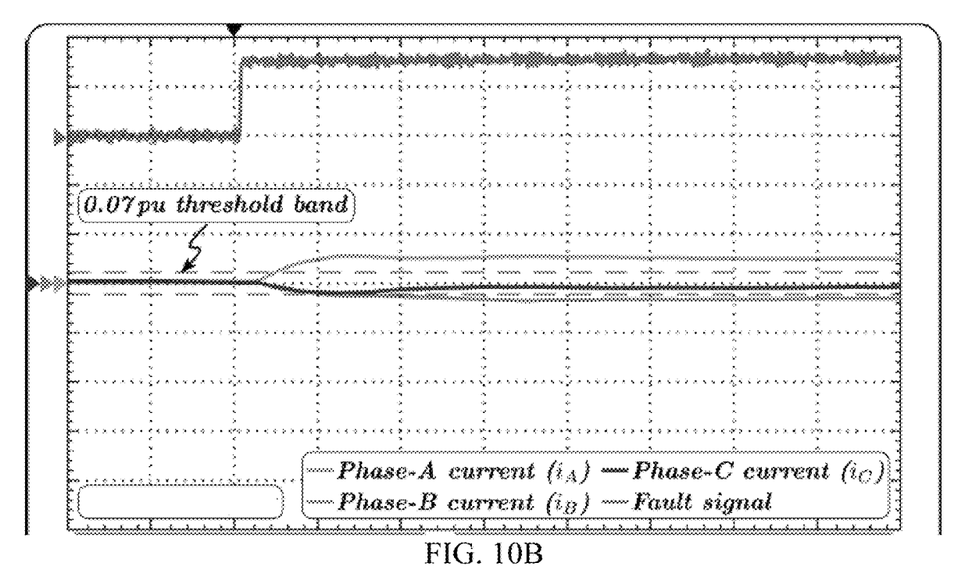

FIGS. 10A-10B show the phase current waveforms when a secondary side fault is introduced at the phase-A top switch ($T_{a1}$). FIG. 10A shows the waveform signature and FIG. 10B shows the time averaged waveforms over $T_s$. The averaged waveforms show the DC bias built in the phase currents in the fault mode. The current $i_A$ shows a positive DC bias, and the currents $i_B$, $i_C$ develop a negative DC bias in transient mode and the DC bias in current $i_C$ decays to zero in steady-state. This pattern matches the predicted pattern in Table 1. FIG. 10B also indicates that a threshold of 7% (0.07 pu) with respect to the input DC current can be used for fault identification using the logic-based scheme.

A comparison of FIGS. 9A-9B and FIGS. 10A-10B indicates that the impact of a primary side fault is much more pronounced than a secondary side fault. Since under normal mode the primary side transistor conducts for 8 of 18 states and the secondary transistor only conducts 1 out of 18 states.

FIG. 9B shows that the phase currents can see up to 1.1 pu of DC bias under the primary fault mode operation, indicating that a corrective action is required. In contrast, FIG. 10B shows that the DC bias produced in the phase currents is less than 0.15 pu under the secondary fault mode operation. It indicates that a 3-Φ DAB converter 101 can be run as a normal converter even with a secondary side fault, since the components are usually rated at more than 1.2 times the nominal/standard requirements. This is a benefit of a 3-Φ DAB converter 101 over a 1-Φ DAB converter, where the impact of a secondary side fault is almost equally pronounced as a primary side fault.

Fault Identification

Figure 11A:
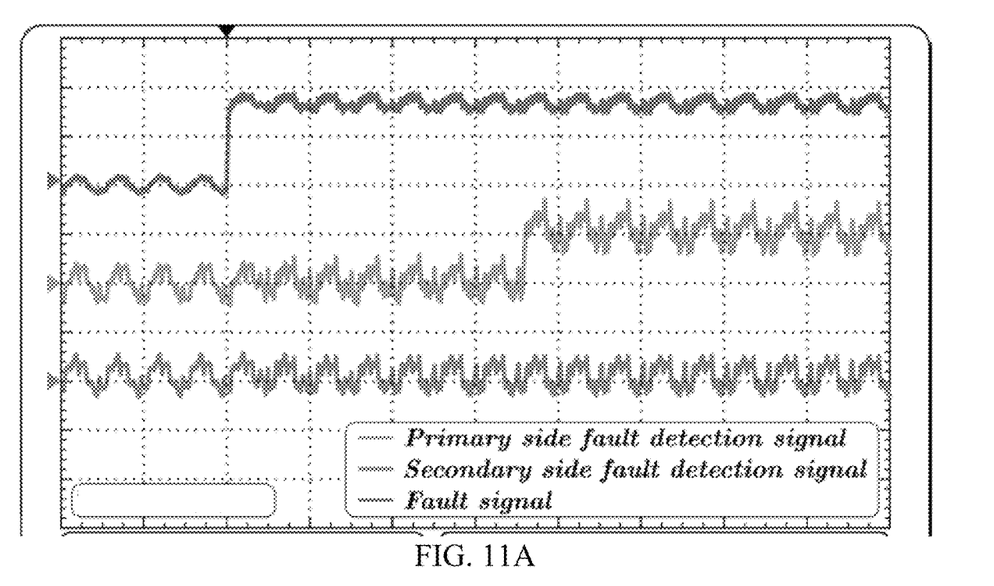
FIGS. 11A-11B show primary and secondary fault detection signals observed using DAC signals from a microcontroller.
Figure 11B:
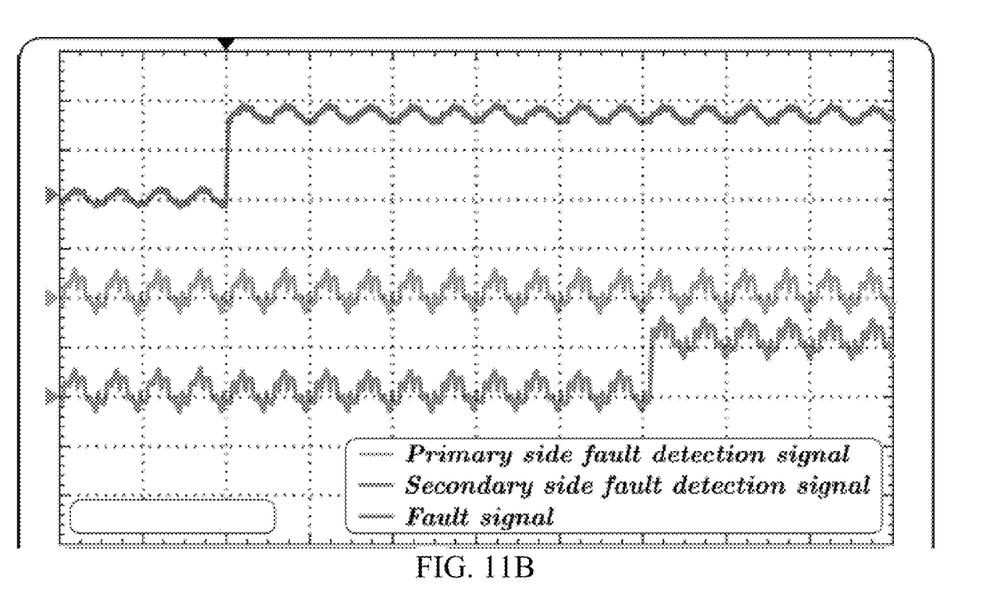

FIGS. 11A-11B show the detection signals using the fault diagnosis scheme when the converter is subjected to faults. The primary and secondary fault detection signals were observed using DAC signals from a micro-controller 120. Under no-fault normal operation both the DAC signals will remain at 0 V. The fault identification scheme can be implemented using a threshold of 8.8% (0.088 pu) with respect to the input DC current.

FIG. 11A shows the detection signals when a fault is introduced at the primary side phase-A top switch ($T_{A1}$). The scheme correctly identifies the faulty transistor ($T_{A1}$) as the primary side detection signal rises within 7 switching cycles from the fault trigger. The secondary side detection signal remains at 0 V indicating no-fault on the secondary side.

FIG. 11B shows the detection signals when a fault is introduced at the secondary side phase-A top switch ($T_{a1}$). The scheme correctly identifies the faulty transistor ($T_{a1}$) as the secondary side detection signal rises within 10 switching cycles from the fault trigger. The primary side detection signal remains at 0 V indicating no-fault on the primary side.

The detection method can be implemented via an electronic controller 120 which may include one or more of the following: an electronic data processor, an interface 121, a data bus, a data storage device, a data port, and a user interface (e.g., electronic display). The electronic data processor and the data storage device may be coupled to the data bus to facilitate communication of data messages among the electronic data processor, the data storage device, the data port, and the user interface. In some embodiments, each of the primary switches of the DAB 101 has a unique corresponding identifier and each of the secondary switches has a unique corresponding identifier. The electronic data processor comprises one or more of the following: a microprocessor, a microcontroller, a programmable logic device, a programmable gate array, an arithmetic logic unit, a Boolean logic unit, an electronic logic circuit or system, a digital circuit, a digital signal processor (DSP), and application specific integrated circuit (ASIC), or another data processing device. In one embodiment, the electronic data processor can execute software instructions stored in the data storage device.

In this disclosure, a diagnosis scheme has been described which identifies a faulty transistor in an open-circuit fault in a 3-Φ DAB converter 101. The AC-link current waveform is systematically analyzed in normal operating and fault conditions, and the DC bias patterns unique to individual transistor failure are identified. The logic-based scheme requires only three low-bandwidth current sensors, with no additional circuit modification.

Additional consideration can be given to the magnitude of DC bias with respect to the fault location, the design of hysteresis in DC bias detection and saturation of transformer-inductor arrangement. In addition, the manner in which the DC bias in the secondary side current is reflected on to the primary side sensors can be evaluated. Stated differently, the pronounced effect of fault in the output currents of the primary converter 111 of the 3-Φ DAB converter 101 causes excessive rise in the magnetizing current of the isolation transformer 113. The three-phase currents supplied by the primary converter 111 have a significant DC component. The fault detection method can be used to promptly shuts down the converter 101 well before the DC/DC power conversion system could destroy itself upon occurrence of an open circuit fault in the primary converter 111. Additionally, should the open circuit fault occur in the secondary converter 112, the method serves as a watch-dog or monitoring system to keep the converter 101 operational without any need for power derating. Therefore, the fault detection system and method could serves as a watchdog when the DC/DC power conversion system needs to work under limp-home mode and keep vehicle auxiliaries functional until next opportunity for maintenance.

The invention may broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

What is claimed is:

1. A method of detecting an open-circuit fault in a three-phase dual active bridge converter comprising:
    detecting that a fault has occurred by sensing a phase current for each phase on a primary side of the dual active bridge converter and identifying whether a DC bias is present in the phase current for each phase;
    identifying whether the fault occurred on a primary side or a secondary side of the dual active bridge converter based on an identification the DC bias of the phase current for each phase;
    identifying exactly which transistor has failed using a DC bias pattern; and
    continuing operation of the three-phase dual active bridge converter without power derating when the fault is identified in the secondary side.

2. The method of claim 1, further comprising:
    passing the sensed phase current through a low-pass filter.

3. The method of claim 1, further comprising:
    calculating the moving average of the sensed current for each phase over a switching period.

4. The method of claim 1, further comprising:
    identifying the DC bias as positive or negative.

5. The method of claim 1, wherein identifying whether the fault occurred on a primary side or a secondary side of the dual active bridge converter comprises:
    identifying the fault on the primary side if all phase currents show DC bias; and
    identifying the fault on the secondary side if some but not all phase currents show DC bias.

6. The method of claim 1, wherein identifying exactly which transistor has failed comprises:
    identifying a faulty transistor based on a table of known DC biases for a fault.

7. The method of claim 1, further comprising:
    stopping operation of the three-phase dual active bridge converter when the fault is identified in the primary side.

8. The method of claim 7, wherein operation is stopped prior to an excessive rise in a magnetizing current of an isolation transformer of the three-phase dual active bridge converter.

9. The method of claim 1, wherein detecting that a fault has occurred comprises:
    identifying a threshold on the input DC current.

10. The method of claim 9, wherein the threshold is 15% to identify a fault on the primary side.

11. The method of claim 9, wherein the threshold is 7% to identify a fault on the secondary side.

12. A system for detecting a fault in a three-phase dual active bridge converter, the system comprising:
    a dual active bridge converter comprising a primary side converter, a secondary side converter, and a transformer;
    an interface for measuring a current at an output terminal of the primary side converter, the interface coupled to an input of a low-pass filter;
    the low-pass filter configured to isolate a DC signal component derived from the measured current at the output terminal of the primary side converter;

a controller adapted to perform the followings steps:
- detect polarity states of a DC signal component in each phase of the output terminal of the primary side converter during one or more successive sampling intervals;
- compare the polarity states to a bias pattern;
- matching the polarity states to a corresponding fault of the bias pattern during one or more sampling intervals to identify the fault on the primary side converter or the secondary side converter; and
- continuing operation of the three-phase dual active bridge converter without power derating when the fault is identified in the secondary side converter.

13. The system according to claim 12, wherein detecting the polarity states of the DC signal further comprises comparing the input to a second input coupled to a DC reference voltage.

* * * * *